Oct. 3, 1967
M. D. APPLEMAN
3,345,152
METHOD AND MEANS FOR CONVERTING ODORS
IN MANURE AND HUMAN EXCRETA
Filed July 6, 1964
3 Sheets-Sheet 1
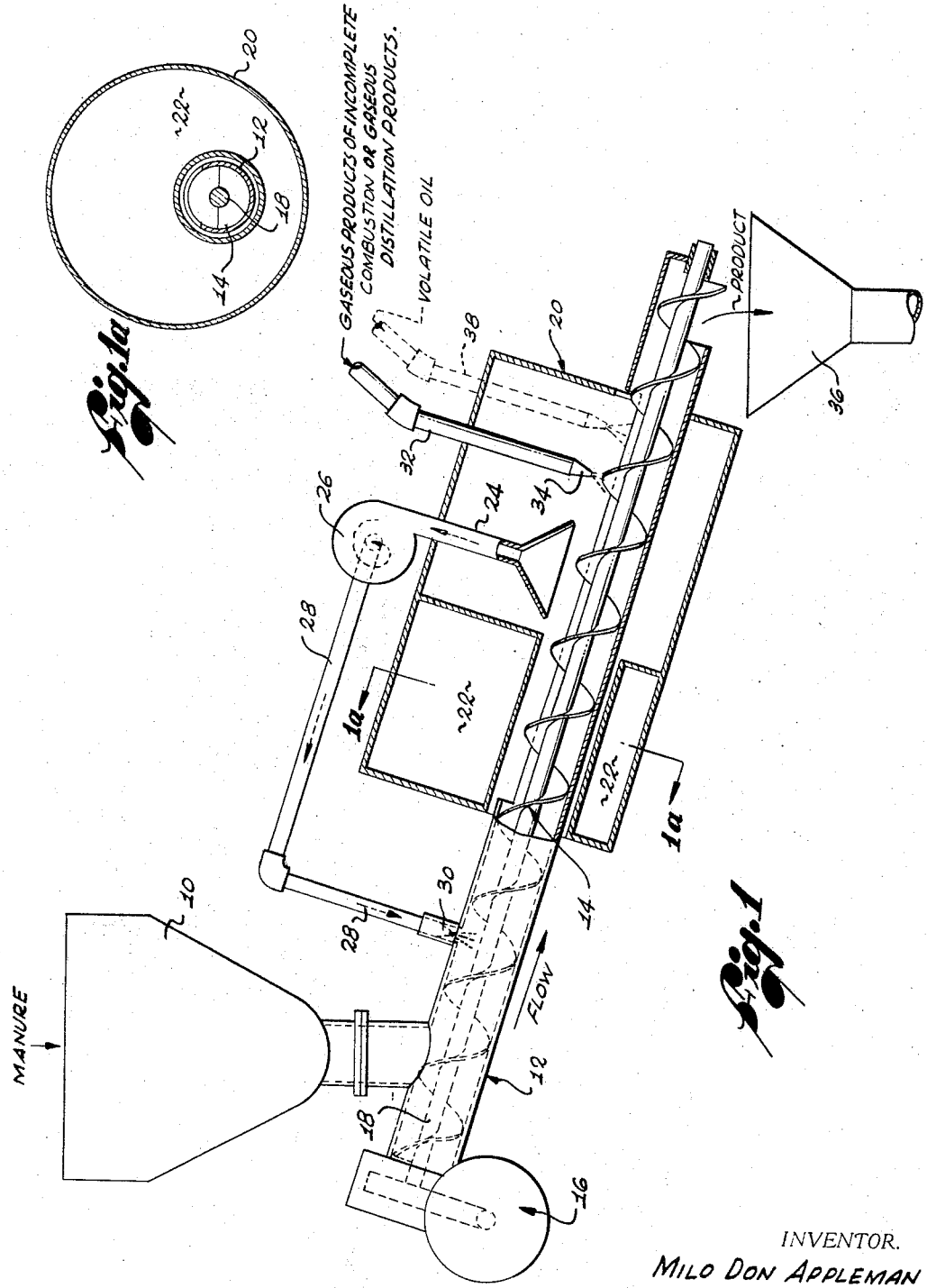
INVENTOR.
MILO DON APPLEMAN
BY Fulwider, Patton, Rieber,
Lee, and Utecht
ATTORNEYS

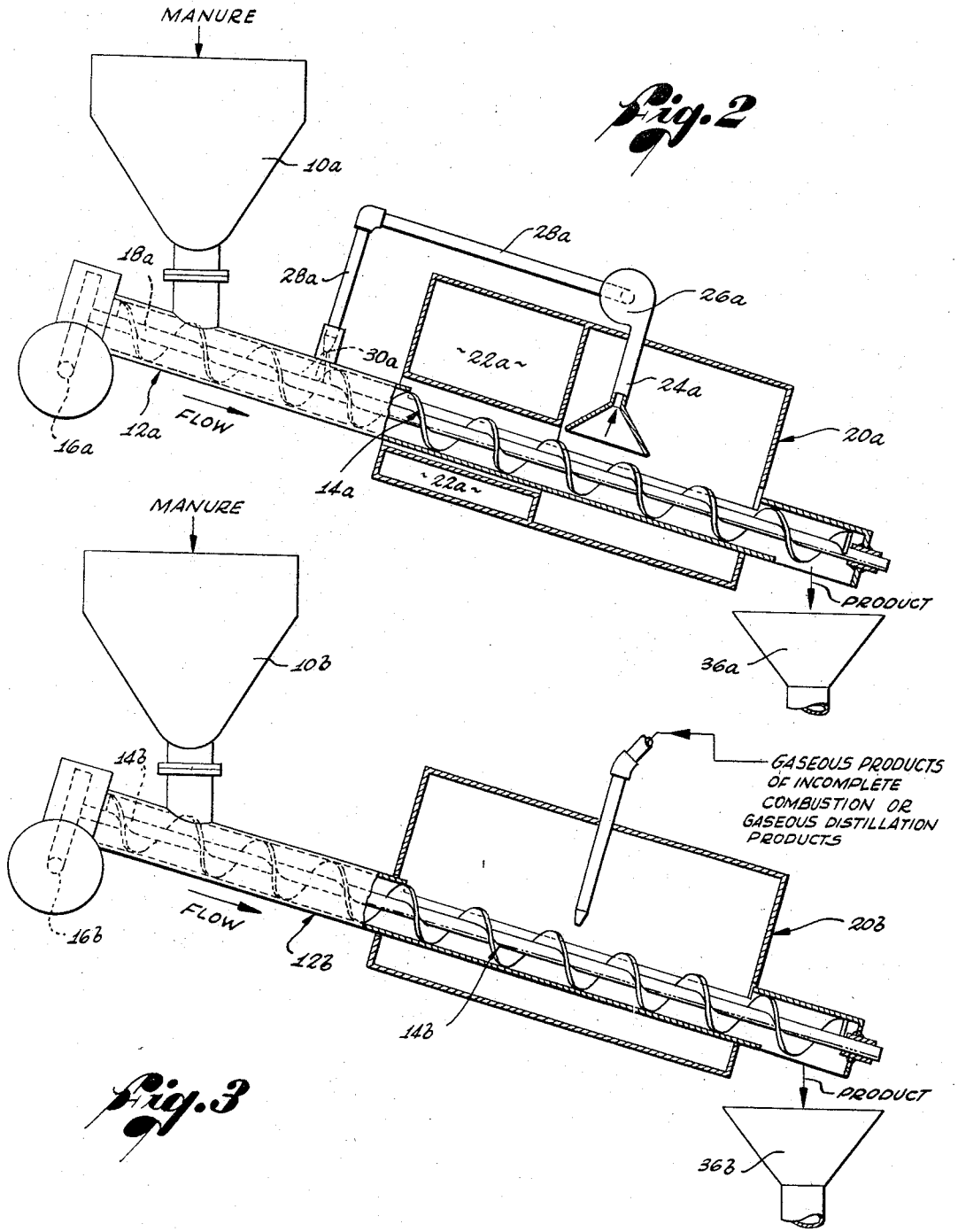

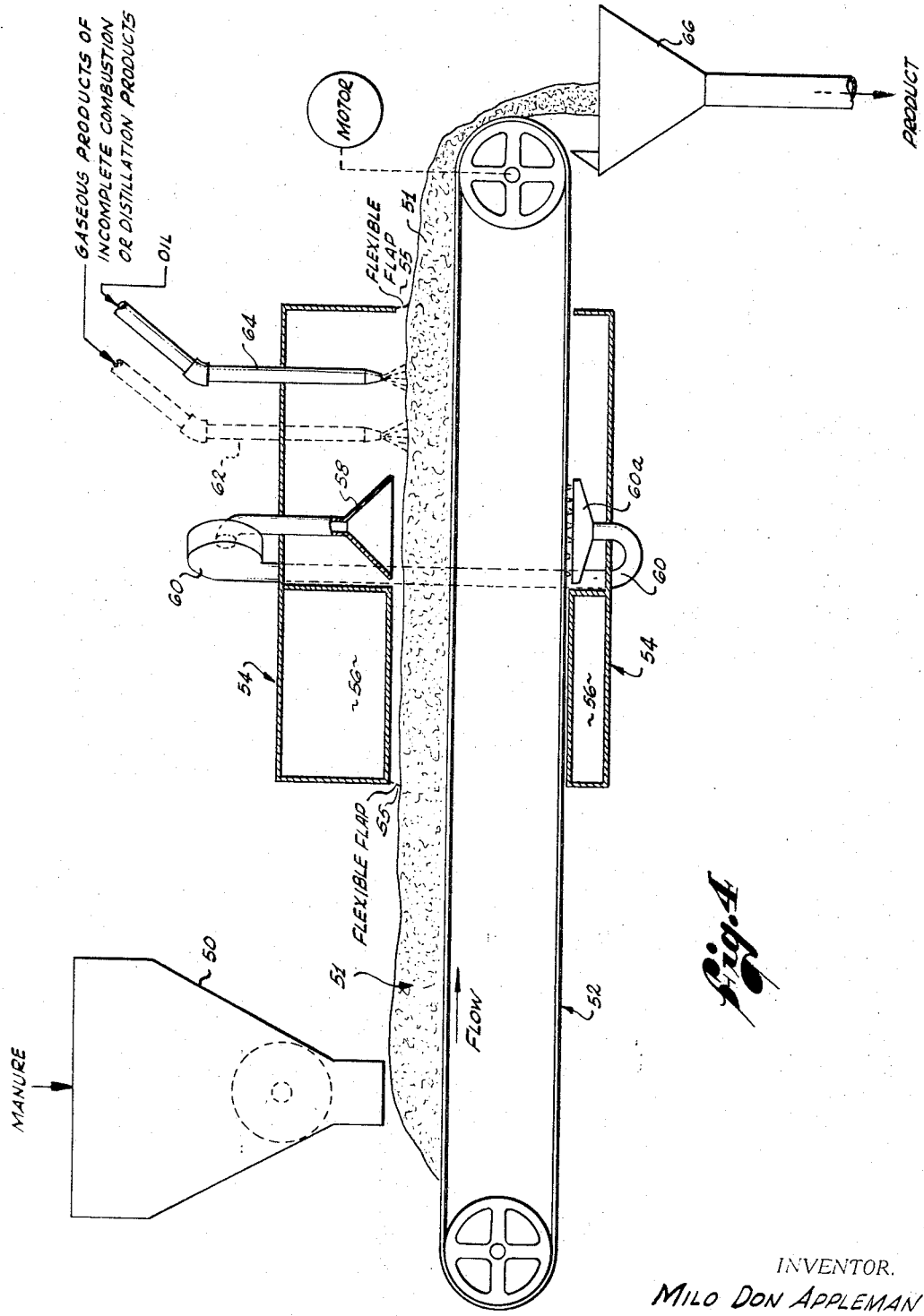

United States Patent Office 3,345,152
Patented Oct. 3, 1967

3,345,152
METHOD AND MEANS FOR CONVERTING ODORS IN MANURE AND HUMAN EXCRETA
Milo Don Appleman, Los Angeles, Calif., assignor to Jack J. Schroeder, Long Beach, Calif.
Filed July 6, 1964, Ser. No. 380,236
9 Claims. (Cl. 71—21)

This invention relates generally to a method and means for deodorizing manure and other excreta, and relates especially to a method and means for permanently converting the odor of manure and human excreta to an entirely nonoffensive state.

Many methods for deodorizing manure have been utilized in order that it may be packaged, stored, transported, sold through retail outlets, and used as a fertilizer, without difficulty, discomfort and annoyance to users, handlers, and persons in general. To this end, manure has been heated to dryness in an effort to remove odorous elements and compounds therefrom, and additives of many types and varieties have been added in an effort to mask, or otherwise modify the odorous-producing compounds in the manure.

I have found that none of the present methods of ridding the manure or human excreta, of which I am aware, are permanently effective. Thus, sun-dried or rotary-dried manure, after being moistened, as by a rain or by artificial watering, will immediately revert to its former vile-smelling original odor. To my knowledge, no simple, effective and inexpensive means of permanently ridding manure of the odors normally associated therewith has been found by others.

It is, therefore, a major object of the present invention to provide a novel method and means for permanently converting the original odors inherent in manure and/or human excreta to a substantially more pleasant odor in a simple and inexpensive manner involving the intimate contact of the manure and/or human excreta with one or more gaseous products (containing aldehydes and ketones, phenols and organic acids), especially those selected from one or more of the following materials: gaseous distillation products of cellulosic materials, incompletely combusted gaseous products of cellulosic materials, gaseous distillation products of the manure and/or human excreta, or incompletely combusted gaseous products of the manure and/or human excreta, the temperature of heating of the foregoing materials being usually conducted in the range of 180° F. to 600° F.

It is another object of the present invention to provide a novel method and means for permanently and completely changing the odor of manure, which method and means is very simple and effective and does not require the addition of compounds extraneous to that of the manure itself.

Still another object of the present invention is to provide a continuous method and means for converting or changing the odor of manure to a tobacco-like odor in a simple and effective manner by means of heat distillation of the manure and returning the thus produced gaseous products of the manure (preferably after removal of water vapors) into the distilled manure, or fresh manure, whereby a permanent change to a tobacco-like odor occurs, which odor is not unpleasant and which odor remains fixed over periods of time of a year or more.

A further object of the present invention is to provide a continuous method and means for permanently converting the original odor of manure by distillation of manure, passing the resulting gaseous products of the distillation (after removal of water vapor) through fresh or distilled manure, and contacting said manure with other gaseous products to further convert the original odor in the manure to a more pleasant, and indeed very bearable, condition.

It is yet another object of the present invention to permanently convert the odors of manure and/or human excreta to an odorous condition that is substantially more pleasant than the original condition by passing through said manure and/or human excreta, only those gaseous products of the incomplete or partial combustion or distillation of cellulosic products, such as wood or plant materials.

These, and other objects of the present invention, will become clear, with reference to the description which follows and to the accompanying drawings, wherein:

FIG. 1 is a diagrammatic flowsheet of a first, and presenty preferred, embodiment of my invention;

FIG. 1a is a cross-sectional view taken along line 1a—1a of FIGURE 1;

FIGURE 2 is a diagrammatic flowsheet of a second embodiment of my invention;

FIG. 3 is a diagrammatic flowsheet of a third embodiment of my invention; and

FIG. 4 is a diagrammatic flowsheet of a fourth embodiment of my invention.

In general, my preferred method and means for converting and fixing the changed odor in manure and/or human excreta involves a distillation of manure at a temperature of between about 180° F. to 600° F. (or higher), intimately contacting the gaseous distillation products produced (preferably after removal of some or most of any water vapors in said gaseous distillation product) with fresh manure and/or human excreta itself, further distillation of the said manure and/or human excreta and then intimately contacting the said manure and/or human excreta with the gaseous distillation products derived from cellulosic materials such as wood or plant materials at least about 40%, by weight, of cellulose.

The distillation of the manure and%or human excreta is thus preferably performed in the complete absence of oxygen; however, the presence of some oxygen, during the heating of the manure, can be tolerated so long as there is a substantial amount of incompletely combusted gaseous product produced for later contact with the manure and/or human excreta. Similarly, the gaseous products derived from cellulosic materials are preferably obtained in the complete absence of oxygen; however, the presence of some oxygen, during the heating of the cellulosic materials, can be tolerated so long as there is a substantial amount of incompleted combusted gaseous product for contact with the manure and/or human excreta. While the foregoing general description of my process is preferred, other methods and means of obtaining the objects of my invention may be employed.

Thus, the odor of the manure and/or human excreta is converted to a tobacco-like odor permanently, i.e., for a year or more, by contacting it solely with the distillation products, or incompletely combusted products, of manure that have been heated to at least 180° F. and preferably in the 350° F. to 500° F. range. Distillation products from other sources need not contact the manure and/or human excreta for complete and effective odor conversion to take place.

Where a different odor fixation is desired, the manure and/or human excreta may be intimately contacted solely with the distillation products or incompletely combusted products of cellulosic materials. The odor of the manure and/or human excreta is permanently converted to an odor resembling that of the barbecue or smoked meats.

The preferred method and means, as already mentioned, utilizes several distillation processes more or less simultaneously and the resulting manure and/or human excreta product achieves a more intense "barbecue-like"

permanently fixed odor than that obtained by the process set out in either of the two previous paragraphs.

Permanent conversion of the odor of the manure and/or human excreta appears to occur for several reasons (although I do not intend to be limited by the following explanation of the underlying causes). Where the term "manure" is used, by itself, and in the claims, it includes excrement from humans. In the preferred process above described, the distillation of the manure takes place at a temperature of at least 180° F. and preferably in the range of 350° F. to 500° F. so that products of the manure distillation (or partial combustion) include skatole, indole, putrescine, hydrogen sulfide, and mercaptans. These are highly odor-producing compounds. The distillation products also include a greater amount of aldehydes, ketones, phenols and organic acids and water vapor In the substantially oxygen-free atmosphere in the heating zone, the highly odorous and undesirable compounds are converted into new non-odorous or agreeably odorous products apparently by interaction with the aldehydes, ketones and phenol. The bulk of the water vapor is then preferably removed, and the distillation products then contain mainly aldehydes, ketones, phenols and organic acids.

The distillation products are preferably returned for intimate contact with either fresh manure or distilled manure in the gaseous state (although they may also be first condensed). The distillation products react with, and/or are absorbed by, manure, and the manure, in turn, loses its disagreeable odor—the manure being converted to the tobacco-like odor mentioned previously. Following this reaction, the remaining odorous volatile products in the manure are removed, by distillation (unless they have been previously removed), thus further converting the odor of the material. When the products of distillation of the cellulosic materials (including aldehydes and phenols) are brought into contact with the manure, again further reactions and/or absorptions occur which convert the material to a completely different and permanent "barbecue-like" odor.

Referring now in detail to the drawings and especially to FIGURE 1 thereof, the presently preferred embodiment of my invention is there shown. Manure is fed into feed hopper 10 by manual or other suitable means (not shown) and falls into an inclined pipe 12 carrying a screw conveyor 14 of conventional configuration. Screw conveyor 14 is powered by a motor 1 6arranged to rotate the shaft 18 of the screw conveyor. The screw conveyor rotates in a direction such that the flow of material therein is in the downwardly direction.

The manure and/or human excreta at room temperature is transferred, by gravity, from feed hopper 10 into the screw conveyor pipe 12 and is conveyed downwardly therein by means of the screw conveyor 14 into a heated zone or chamber 20 surrounding the screw conveyor pipe 12 in a substantially air-tight manner.

Hot gaseous products of distillation of the manure and/or human excreta intimately contact the fresh manure and/or human excreta prior to its entry into the heated zone 20, as will be described hereafter in detail, and the odor of the material is thereby initially converted.

The material then passes into the heated zone 20 and is subjected to a first distillation process, as will now be described.

The screw conveyor pipe 12 only partially encloses the screw conveyor 14 within the zone 20, thereby exposing the material more directly to the heat generated within a heated portion or furnace 22 within heated zone 20.

The temperature within the heated zone 20 is maintained at a temperature in the range of preferably between 400° F. to 550° F. whereby to heat the manure to a distillation temperature of preferably between about 350° F. to 500° F. Higher temperatures of operation may be employed but this is a matter of economics, e.g., a temperature of 600° F. and higher can be employed. Volatilization of the aldehydes, phenols, organic acids, ketones, and the odorous components, skatole, indole, putrescine, hydrogen sulfide and the mercaptans within the manure and/or human excreta commences as low as 180° F. and the temperature of the zone 20 could be maintained at a temperature in the neighborhood of 180° F. if desired (at this temperature, charring of the manure and/or human excreta just commences). However, the rate of throughput of material would necessarily be considerably reduced, in order to effect the required amount of distillation, and operation at this low a temperature would not be too practical, from an economic point of view. The rate of throughput of material heated to a 400° F. temperature lies in the approximate range of 20–60 tons/hour (based on a pipe diameter of 2–3 feet) and, of course, is quite variable depending upon the specific material being processed, the amount of moisture therein, the precise configuration of the apparatus and other factors.

The gaseous products of distillation are removed from the heated zone 20, via exhaust pipe 24, and are returned to screw conveyor pipe 12, via exhaust fan 26, and return pipe or line 28. The bulk of the water vapor is generally removed as by a cyclone (not shown).

The gaseous products of distillation (other than the water vapor) are injected into incoming fresh manure material, through a nozzle 30. In this way, the products of distillation are intimately mixed with fresh material, and are condensed therein.

As previously explained, reactions and/or absorption occur between the gaseous products of the distillation and the fresh material whereby the disagreeable odor of the manure and/or human excreta material is, in some manner, eliminated and converted to a much more satisfactory tobacco-like odor.

It will thus be noted that after the material has passed beyond the exhaust pipe 24 (and has already been intimately admixed with the products of distillation of the material itself to effect certain unknown reactions), it also has been subjected to a high temperature distillation, to remove many of the remaining odor-producing compounds in the material. The moisture level of the manure is also considerably reduced from an initial value ranging between 18–22% (on a wet basis) to about 2–6% (on a wet basis). To this point in the process, the material has a tobacco-like odor which is completely different from the original odor of the manure and/or human excreta and this tobacco-like odor is fixed and permanent.

The manure, processed to this point, could be discharged from the system, bagged and shipped, or otherwise handled and would be, and is, entirely satisfactory. This process, per se, is shown in FIGURE 2. In order to avoid duplication of description, it will be understood that the numbers in FIGURE 2 (followed by an "a") corresponding to the numbers in FIG. 1 designate the same equipment and process as described with reference to FIG. 1.

It should also be noted that if the manure and/or human excreta were merely processed by atmospheric drying, or even volatization at a higher temperature, e.g., 400° F., no permanent fixation of any changed odor occurs. Upon moistening the manure, thus processed, the original odor immediately reappears. The explanation for the vast difference in result obtained by utilization of the process embodiment, just described, appears to lie in the reaction of fresh incoming manure with the gaseous products of the manure distillation which contain mainly aldehydes, phenols, organic acids and ketones.

It should also be pointed out that the fertilizing or nutrient value of the manure treated in accordance with the process description of FIGURE 2 is equal to unprocessed manure and/or human excreta.

Variants of the process as described to this point can be employed. For example, the distillate can be reacted with already distilled manure by leading pipe 28 into the manure on the downstream side of exhaust pipe 24. Also, another variant involves elimination of the exhausting system 24, 26 and 28 in FIG. 1 and allowing the gases produced by the heating of the manure to contact fresh incoming manure by natural upward movement of the gases so produced. While the water content of the finished product is not reduced to the same extent, this is an economical and useful mode of operation.

Referring again to FIGURE 1, in order to convert the odor in the manure from a tobacco-like odor to one that may be more acceptable to some, the manure, after being distilled, as described, passes downwardly beyond exhaust pipe 24 and contacts gaseous products of distillation of cellulosic materials such as wood products or plant material. The products of this distillation shall sometimes be referred to hereinafter as "smoke," and the process of contacting the manure with the smoke shall be referred to sometimes hereinafter as smoking.

In FIGURE 1 the gaseous products of distillation of the cellulosic material are fed into inlet pipe 32, and are injected into the manure and/or human excreta through a sprayer nozzle 34. Intimate admixture of the gases, i.e., the smoke, and the manure occur and the gases are eventually all trapped within the manure and condensed therein, as the manure continues its downward movement. Escape of the smoke into the atmosphere is prevented by means of the walls of chamber 20, and chamber 20 may be referred to hereinafter as a smoking chamber since it is filled with smoke-like gases.

In order to effect the second conversion of the original manure odor, it is found that relatively small amounts of cellulosic material only need be distilled to provide sufficient smoke for the "smoking" step of the process. It has been found that as little as 3 pounds of cellulosic material per ton of manure and/or human excreta, e.g., walnut hulls, maple, hickory or sawdust, need be distilled to effect a definite odor conversion. However, it is preferred to employ 7 pounds–20 pounds of cellulosic material per ton of manure to insure permanent odor conversion.

The cellulosic materials employed may be those such as wood chips or shavings, sawdust, walnut hulls, maple, hickory chips, straw, and generally contain at least 40% cellulose. The cellulosic materials are preferably distilled at temperatures of 350° F. to 500° F. and the products of distillation include aldehydes, phenols, organic acids and ketones, which are believed to be responsible for the odor conversion, as previously described. Distillation temperatures higher than 500° F. may be employed but are not required. The preferred distillation temperature is in the neighborhood of 400° F. The distillation of the cellulosic material preferably takes place in the total absence of oxygen; however, if incomplete combustion of cellulosic materials occurs, rather than distillation, such gaseous products can also be utilized.

The resultant product is discharged at the lower end of the screw conveyor pipe 12 into collection hopper 36, and is ready for bulk shipment, packaging, storage, other handling, or for direct consumer use.

Certain volatile oils, such as pine oils or eucalyptus oils, may be added to the manure either during the smoking process, or thereafter, if the odor provided by these compounds is desired. This additional step is shown in dotted line in FIGURE 1, the volatile oil being added to the chamber 20, via line 38.

It has been found that the process described with reference to FIGURE 1 may be considerably simplified if one desires substantially less of a "barbecue-like" odor in the finished product. Reference is here made to FIGURE 3 wherein a continuous process and means is schematically illustrated wherein cold fresh manure is passed downwardly in screw conveyor 12b, and contacts gaseous products of distillation or of incomplete combustion in chamber 20b. "Smoking" of cold, i.e., unheated, manure occurs, and the odor of the manure is converted to a "barbecue-like" odor, but considerably milder than is obtained by the process described with reference to FIGURE 1.

The actual smoking process is conducted in a manner substantially the same as that set forth with respect to FIGURE 1, and the materials, temperatures, ranges, and other modes of operation there set forth are equally applicable in this simplified process.

Referring now to FIGURE 4, a fourth embodiment of my process is shown wherein the manure and/or human excreta to be processed is conveyed through the process system in the form of a flat layer or bed of material of, say, 6″ to 12″ in depth and 2′ to 10′ or more in width, rather than being conducted through the system in a screw conveyor pipe. The main advantage of such a system over that shown in FIGURE 1 is its much larger capacity.

Manure and/or human excreta is fed from feed hopper 50 onto a flat endless conveyor belt 52 to form the bed 51 thereon. The manure and/or human excreta passes into an enclosed substantially air-tight cylindrical chamber or zone 54, and is heated therein to a preferred temperature of between about 350° F. to 500° F. by means of heat exchange with the heated portion or furnace 56 in the zone 54 in a manner similar to that described in FIGURE 1 and FIGURE 1a. The chamber 54 is provided with flexible flaps 55 at the inlet and outlet thereof to prevent air leakage into the chamber.

The bed of manure 51, upon heating to the preferred temperature, is volatilized or distilled, and the gaseous products of distillation are carried upwardly through exhaust pipe 58 by means of a fan 60. The water vapor in the gases is condensed by a cyclone (not shown) and the remaining gases are returned into the bed of manure 51 through return pipe 60, the return pipe having a flared inlet 60a residing within zone 54 and being placed beneath exhaust pipe 58.

The heated manure, after passing beyond exhaust pipe 58, has been both distilled and allowed to react with the "dried" gaseous products of distillation of earlier distilled manure and, at this point, has fixed therein the tobacco-like odor described previously. The manure then directly contacts the gaseous products of distillation or incomplete combustion thereof emanating from inlet pipe 62 and is "smoked" within the chamber 54. The amount of gas required per ton of manure is that obtained from about 3 pounds to 20 pounds of cellulosic material, such as walnut hulls, as previously mentioned.

A volatile oil may be introduced if desired, to further modify the odor, and thus may be introduced during or after the smoking operation. The oil may, for example, be introduced via line 64 into chamber 54.

The finished product falls off the belt 52 into collection hopper 66 for direct consumer use if desired.

It is to be understood that the distillation of the manure, the intimate contact of the dried gaseous products of distillation and the smoking step may be practiced simultaneously, concurrently, or in any order deemed most expedient. The arrangements shown herein are presently preferred but modifications can be made. For example, sulphur dioxide fumes may be passed through the manure (on the order of 0.1 to 1% by weight) *in combination with* one or more of the foregoing steps of my process, to further alter the finished product odor.

Specific examples of my process follow, it being understood that these are merely illustrative and not to be construed as limiting the invention in any way.

*Example I*

One ton of manure having 20% moisture (on a wet basis) is fed into hopper 10 of FIGURE 1 and is conveyed downwardly in pipe 12 contacting dried gaseous products of manure distillation at nozzle 30, and is then heated to a temperature of about 400° F. as the manure passes into furnace 22 of chamber 20. Heating of the furnace 22 is accomplished by means of the burning of gas, or in other suitable manner.

The gaseous products of distillation produced comprise approximately 90% water vapor, approximately 1% or less of the main odorous components, skatole, indole, putrescive hydrogen sulfide, and mercaptans, and the remainder gaseous constituents including aldehydes, ketones, phenols, and organic acids.

All of these gases pass upwardly in exhaust pipe 24, the bulk of the water vapors are removed by cyclone action, and the gases remaining are returned via pipe 28 and nozzle 30 into fresh manure.

The manure passing beyond exhaust pipe 24 has thus been subjected to 2 different treatments: first, intimate contact with the above described gaseous components, and second, a distillation at 400° F. in the absence of any substantial amounts of oxygen. The manure, after entering zone 20, is also being subjected to a smoking action resulting from the injection of the gaseous products of distillation of 10 pounds of walnut hulls for every ton of manure being passed through the conveyor pipe 12. The distillation of the walnut hulls takes place at a temperature of 400° F. and in the absence of any substantial quantities of air.

The rate of throughput of manure is such that the manure is retained within the smoking chamber for about 90 seconds. The exposure time is quite variable, and can be as low as 10–20 seconds if higher smoke densities are employed. The resulting product has 4% moisture.

The product is then discharged into hopper 36, and is allowed to cool. It is bagged, and is ready for shipment. The product has a permanent strong barbecue odor, and does not resemble the odor of the original manure in any way.

Example II

The process of Example I is followed except that the gaseous products of distillation are allowed to flow upwardly through the conveyor pipe 14, the gases being trapped and condensed by fresh incoming manure. The exhaust system 24, 26, and 28 is not employed.

The resulting product has 10% moisture, and has a strong barbecue-like odor very comparable to the product produced by the process of Example I.

Example III

The process of Example I is followed and, in addition to the process steps there called out, 1 pound of pine oil is added, through pipe 38, for every ton of manure processed.

Example IV

The process of Example I is followed except that 20 pounds of hickory chips are subjected to a heating, in the absence of air, to a temperature of 600° F., and the gaseous products of distillation are transferred into the smoking chamber 20 as before. Because of the increased intensity of smoke within the smoking chamber 20, the exposure time of manure passing therethrough is about 20 seconds for approximately equivalent odor conversion and fixation to that produced by Example I.

Example V

The process of Example I is followed except that approximately 20% of the stoichiometric amount of oxygen necessary for combustion of the gaseous products of distillation of the manure is present. The resulting product is not noticeably different in odor from that produced in Example I.

Example VI

The process of Example I is followed except that approximately 20% of the stoichiometric amount of oxygen necessary for the combustion of the gaseous products of distillation of the walnut hulls is present. The resulting product is not noticeably different in odor from that produced in Example I.

Example VII (based on the process shown in FIGURE 2)

The process of Example I is followed with the exception that the step of contacting the distilled manure with gaseous products of distillation from an extraneous source, such as hickory chips, is completely omitted. The product resulting has a permanent odor akin to that of tobacco leaves.

Example VIII

The process of Example II is followed with the exception that the step of contacting the distilled manure with gaseous products of distillation from an extraneous source, such as hickory chips, is omitted. The product resulting has a permanent odor akin to that of tobacco leaves.

Example IX

The process of Example I is followed except that the manure enters zone 20b (in FIGURE 3) unheated, and there contacts the gaseous products of distillation. The same proportion of smoking gases to manure is employed as in Example I.

The resulting product has a much milder barbecue-like odor than the product of FIGURE 1, but the final odor of the product has a barbecue odor, and the odor is permanent.

Example X

The process steps of Example I are followed except that a bed of manure of approximately 6″–7″ is maintained on a conveyor belt of 4′ in width as opposed to the screw conveyor mode of operation of Example I. The same materials, ratios of materials, and temperature conditions, utilized in Example I were utilized in this example.

The product has a permanent strong barbeque odor and does not resemble the odor of the orginal manure in any way.

I claim:
1. A process for converting the odor of manure from excreta, which comprises the steps of:
   heating manure to a temperature of at least 180° F. in the substantial absence of oxygen to produce thereby a gaseous effluent and hot manure;
   contacting manure with said gaseous effluent, before said manure is heated, to produce a manure product having a permanently changed odor; and
   removing said gaseous effluent after said odor change.
2. The process of claim 1 wherein said manure is heated to a temperature of between about 350° F. to about 500° F.
3. The process of claim 1 wherein a major portion of the water in said gaseous effluent is removed prior to contact of said gaseous effluent with said manure.
4. The process of claim 1 wherein a volatile oil is added to said hot manure.
5. A process for converting the odor of manure from excreta, which comprises the steps of:
   heating manure to a temperature of at least 180° F. in the substantial absence of oxygen to produce thereby a gaseous effluent and hot manure;
   contacting hot manure with said gaseous effluent for a time sufficient to produce a manure product having a permanently changed odor; and
   removing said gaseous effluent after said odor change.
6. The process of claim 5 wherein a major portion of the water in said gaseous effluent is removed prior to contact of said gaseous effluent with said hot manure.
7. The process of claim 5 wherein a volatile oil is added to said hot manure.
8. A process for converting the odor of manure from excreta which comprises the steps of:
   heating manure to a temperature of at least 180° F.

in the substantial absence of oxygen to produce thereby a gaseous effluent;

contacting manure with said gaseous effluent before said manure is heated to produce a manure product having a permanently changed odor;

heating a cellulosic material containing at least about 40% cellulose by weight, at a temperature of at least about 180° F. and in the substantial absence of oxygen to produce gaseous products;

contacting said gaseous products with said manure after said manure is heated; and removing said manure from contact with said gaseous effluent and from contact with said gaseous products after said permanent odor change has occurred.

9. A process for converting the odor of manure from excreta which comprises the steps of:

heating manure to a temperature of at least 180° F. in the substantial absence of oxygen to produce thereby a gaseous effluent;

contacting manure with said gaseous effluent, after said manure is heated, to produce a manure product having a permanently changed odor;

heating a cellulosic material containing at least about 40% cellulose by weight, at a temperature of at least about 180° F. and in the substantial absence of oxygen to produce gaseous products;

contacting said gaseous products with said manure; and removing said manure from contact with said gaseous effluent and from contact with said gaseous products.

References Cited

UNITED STATES PATENTS

| | | | |
|---|---|---|---|
| 1,320,405 | 11/1919 | Mudd | 71—21 |
| 2,087,781 | 7/1937 | Randolph | 71—13 |

FOREIGN PATENTS

| | | |
|---|---|---|
| 209,731 | 9/1955 | Australia. |

DONALL H. SYLVESTER, *Primary Examiner.*

S. LEON BASHORE, *Examiner.*

R. BAJEFSKY, *Assistant Examiner.*